United States Patent
Klein et al.

[15] 3,688,161
[45] Aug. 29, 1972

[54] ANODES FOR SOLID ELECTROLYTIC CAPACITORS

[72] Inventors: Gerhart P. Klein, Manchester, Mass. 01944; Ivan L. Wingood, Jr., Bedford, Mass. 01730

[73] Assignee: P. R. Mallory & Co. Inc., Indianapolis, Ind.

[22] Filed: April 23, 1971

[21] Appl. No.: 136,772

[52] U.S. Cl. .................................317/230, 29/570
[51] Int. Cl. .........................H01g 9/05, H01g 13/00
[58] Field of Search .........317/230, 231, 233; 29/570

[56] References Cited

UNITED STATES PATENTS

| | | |
|---|---|---|
| 3,115,596 | 12/1963 | Fritsch.....................317/230 |
| 3,349,295 | 10/1967 | Sparkes....................317/230 |
| 3,403,303 | 9/1968 | Klein.........................317/230 |
| 3,465,426 | 9/1969 | Baier et al. ................317/230 |

Primary Examiner—James D. Kallam
Attorney—Richard H. Childress, Robert F. Meyer and Henry W. Cummings

[57] ABSTRACT

Porous anodes suitable for use in capacitors are prepared by forming moistened metal powder into a mass, freezing the moistened mass thereby bonding the metal powder together and sintering the mass to convert it to a porous pellet suitable for use as an anode for a capacitor. A hole is provided in the anode, extending perpendicular or parallel to the longitudinal axis of the anode.

17 Claims, 11 Drawing Figures

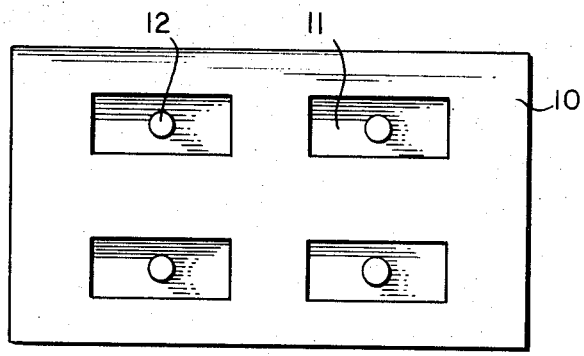
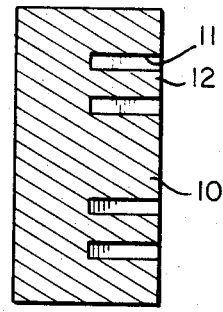
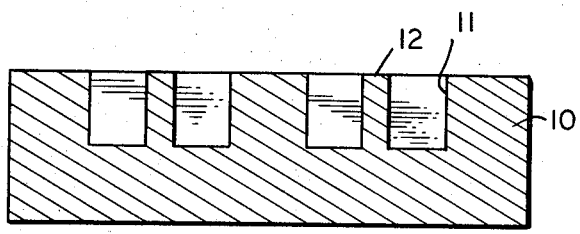
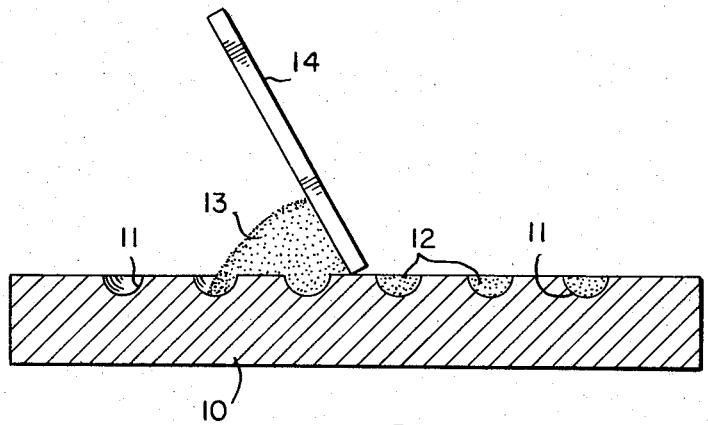
INVENTORS
GERHART P. KLEIN
IVAN L. WINGOOD, JR.
ATTORNEY

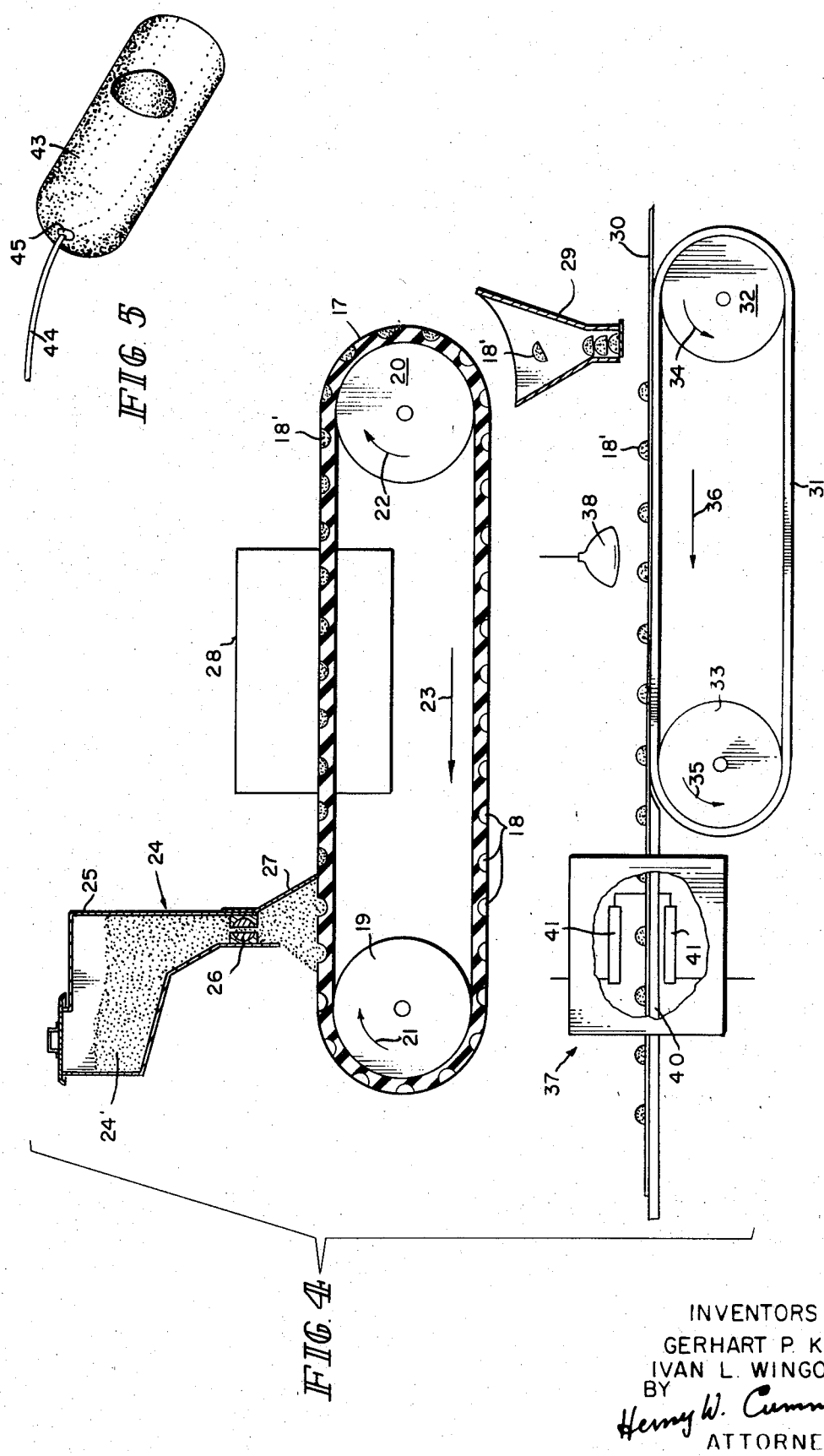

ANODES FOR SOLID ELECTROLYTIC CAPACITORS

In the past, solid electrolytic capacitors have been manufactured by the following method: a sintered porous slug of metal, obtained by pressing and sintering metallic powder, is anodized in an electrolyte to form an oxide layer on the surface thereof. The oxide layer serves as a dielectric layer for the capacitor. The porous sintered slug serves as an anode. A film of semiconductor material is deposited over the dielectric oxide layer and a film of conductive material is deposited over the semi-conductor film. The semiconductor film, conductive material and terminating means attached to the conductive material comprise the cathode of the capacitor. A terminating means is attached directly to the porous sintered slug as the anode lead for the capacitor.

As a specific example of the above established general process, assume that the porous sintered slug is obtained by pressing and sintering tantalum powder. In that case, the dielectric oxide layer formed by anodization in an electrolyte, such as phosphoric acid, is tantalum oxide. The semiconductor film would preferably be manganese dioxide formed by dipping the anodized slugs in an aqueous solution of manganese nitrate and converting the manganese nitrate to manganese dioxide by pyrolysis. A typical conductive layer used on tantalum capacitors is composed of graphite and silver paint.

In the more recent past, it has been found that a porous sintered mass can be obtained by depositing a moistened mass of powder onto a film forming metal foil and sintering the powder to the foil. This particular approach solved many of the problems involved in manufacturing small solid electrolytic capacitors. For instance, several deposits can be formed on a single piece of foil and sintered thereto. The foil can then be processed as a unit until the final step where the individual capacitors are separated.

The elimination of pressing and the binder usually associated therewith significantly reduces contamination problems which reduce the yield and, in some cases, produce undesirable anode characteristics.

In application Ser. No. 17,519 a process is described in which a frozen mass of powder is thawed, dried, and sintered to obtain a porous sintered mass of metal. A lead wire is then welded or otherwise attached to the slug to complete an anode for a solid electrolytic capacitor. An anodic oxide film, semiconductor coating and conductive coating are applied to the porous sintered mass discussed above.

In the practice of the present invention it is also possible to sinter a mass of powder without attaching it permanently to the backing foil. In this case, a wire lead is welded or otherwise connected to the sintered slug to produce an anode.

It is to be pointed out that the basic advantages of powder which is allowed to settle in a liquid are maintained. For instance, the powder masses assume a well rounded shape and the density of the powder masses is such that only short sintering times are required to make porous bodies suitable for manufacturing capacitors.

The amount of powder deposited by one method of the present invention is measured by a volumetric method. Cavities of predetermined size are filled with moist powder and the excess is removed. The powder masses are then frozen and can be handled freely as long as they are still frozen.

The powder masses to be deposited on foil can be given any shape or size by the cavity freezing techniques of the present invention. This fact provides a great degree of flexibility in capacitor fabrication.

It is an object of the present invention, therefore, to provide a novel method for fabricating solid electrolytic capacitors.

It is another object of the present invention to provide a novel method for fabricating anodes for solid electrolytic capacitors.

It is a further object of the present invention to provide a novel method for fabricating anodes for solid electrolytic capacitors wherein frozen masses of metallic powder are placed on metallic foil and are thawed, dried and sintered.

It is yet another object of the present invention to provide a method for fabricating anodes for solid electrolytic capacitors wherein the usual step of pressing metallic powder and the binder associated therewith is eliminated.

It is still another object of the present invention to provide an anode for solid electrolytic capacitors having improved characteristics compared to anodes fabricated by pressing metallic powder.

It is still a further object of the present invention to provide a porous metallic mass sintered to a metallic member so as to provide an anode for a solid electrolytic capacitor, said porous metallic mass having a shape determined by freezing a moistened mass of metallic powder in a cavity of predetermined shape and size.

It is still a further object of the present invention to provide a novel method for producing capacitor anodes wherein a frozen mass of moistened powder is thawed, dried, and sintered to obtain a porous metal.

It is another object of the present invention to provide improved yields of solid capacitors at certain ratings.

It is another object of the present invention to provide solid capacitors having improved high frequency characteristics.

It is another object of the present invention to provide reduced capacitance loss with increase in frequency.

It is another object of the invention to provide lower rate of increase in dissipation factor with frequency increase.

Other objects of the invention and the nature thereof will become apparent from the following description considered in conjunction with the accompanying drawings and wherein like reference numbers describe elements of similar function therein and wherein the scope of the invention is determined from the claims.

For illustrative purposes, the invention will be described in conjunction with the accompanying drawings in which:

FIG. 1 is a top view of a mold used in the practice of the present invention.

FIG. 2 is a side-sectional view of the mold shown in FIG. 1 and FIG. 1A an end view.

FIG. 3 is a view illustrating simple means for depositing controlled amounts of moist powder in the cavities of the mold.

FIG. 4 is a view illustrating a possible setup for continuously freezing moistened powder and depositing the frozen masses of powder on a continuous strip of foil.

FIG. 5 is a perspective view of a sintered slug with a lead wire welded thereto.

Figure 6:
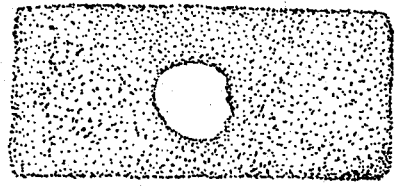
FIGS. 6 and 7 are views of one and two hole embodiments of the present invention.

Generally speaking, the present invention is directed to a porous metallic mass so as to provide a desired shaped article for example an anode for a solid electrolytic capacitor, said porous metallic having a shape determined by freezing a moistened mass of metallic powder in a cavity of predetermined shape and size. After the powder deposit is frozen, it is placed on a sheet of metal, thawed and dried. The dried deposit is presintered and removed from the sheet to provide individual shaped slugs.

Referring to the drawing, and particularly to FIG. 1, the present invention can be visualized in conjunction with the following description.

Figure 7:
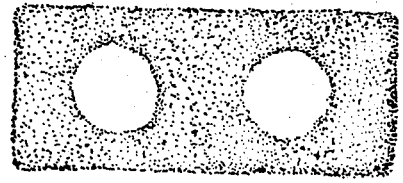

A mold 10 having a plurality of cavities 11 having a shape commensurate with the desired final article shape formed therein may be used in the practice of the present invention. The mold 10 can be made of any number of materials which will release the frozen masses of powder easily. It has been found that silicon rubber molds are particularly suitable because silicon rubber retains its elasticity to rather low temperatures and the frozen masses of powder can be removed therefrom by flexing the molds. Each cavity contains a projection 12 to define a hole all or part way through the anodes to be formed. One hole or a plurality of holes (FIG. 7) may be used.

The size and the shape of the cavities may vary as desired for practical application. It can be seen that the cavities 11 are formed so as to give a rounded shape to the powder deposits frozen therein. This type of deposit is generally easier to remove from the mold than other types such as deposits having square shapes.

A satisfactory silicon rubber mold of the type shown in FIG. 1 has been made by machining a pattern of the shape shown in FIG. 1 into an aluminum plate. The silicon rubber was poured over the pattern and permitted to cure. For example, tantalum powder deposits frozen in silicon rubber molds made in the manner described above weighed from 10 milligrams to 100 grams, having the shape illustrated in FIG. 1.

Referring now to FIG. 3, a simplified technique for using the mold shown in FIGS. 1 and 2 can be discussed. It can be seen that the controlled deposits 12 of moistened powder are deposited in the cavities 11 by scraping a moistened mass of powder 13 across the top surface of the mold 10 with a straight edge means 14. The excess powder is removed by the straight edge means 14 as the cavities 11 are filled. After the cavities are filled the mold and moistened mass of powder are preferably dried partially, to remove excess moisture which would at a later stage of the process lead to a loss of shape of the deposits. They are then subjected to temperatures which will solidly freeze the moistening agent, thereby hardening the deposits. After the deposits 12 are frozen, the mold 10 is flexed, or otherwise handled, so as to remove the frozen deposits. The deposits 12 are then maintained in a suitable environment until they can be placed on the receiving foil.

A mechanical refrigeration system, liquid nitrogen environment, etc. can be used to freeze the deposits 12, as well as to store them until they are placed on the receiving foil.

Referring now to FIG. 4, an illustrative setup for continuously freezing powder deposits and applying said deposits to a foil strip can be discussed.

There is a continuous belt 17 having cavities 18 formed therein as shown. The belt 17 is mounted on a pair of drums 19 and 20 so as to be driven thereby. The drum 19 rotates in the direction of the arrow 21 and the drum 20 rotates in the direction of the arrow 22. Consequently, the belt 17 moves in the direction of the arrow 23.

There is a powder dispensing means 24 adapted to dispense moist powder 24' into the cavities 18. The powder dispensing means is comprised of a powder container portion 25, valve means 26 for controlling the flow of moist powder 24' to the cavities 18, and straight edge means 27 for removing excess powder 24' from the cavities 18.

It can be seen that as the belt 17 moves in the direction of the arrow 23, the cavities 18 are continually filled with a controlled amount of moist powder 24'. The deposits may be dried between 24 and 28.

There is a refrigeration means 28 disposed adjacent to the powder dispensing means 24 for freezing the moist powder deposits 18' in the cavities 18. As stated previously, the refrigeration means 28 must be capable of freezing the moist powder deposits 18' solid. It may be a mechanical refrigeration system, a liquid nitrogen system, etc.

After the powder deposits 18' in the cavities 18 are frozen solid and the belt 17 continues around the drum 20, flexing of the belt 17 as it moves around the drum 20 causes the frozen deposits 18' to fall into and through a cold storage and guide means 29 to a strip of receiving foil 30.

The drum 20 and portion of the belt 17 moving thereon and the cold storage and guide means 29 are maintained at a temperature which will keep the powder deposits 18' frozen until they are placed on the foil strip 30.

A continuous belt 31 is mounted on drums 32 and 33. The drum 32 rotates in the direction of the arrow 34 and the drum 33 rotates in the direction of the arrow 35. Consequently, the belt 31 moves in the direction of the arrow 36 toward a sintering furnace 37.

There is a heating means 38 placed as shown for thawing and drying the frozen deposits 18'. The heating means 38 may be a simple infrared lamp. Similar heating may be used between 24 and 28.

The sintering furnace 37 includes a support member 40 adapted to receive the belt 31 and a pair of resistance heated platens 41 for developing the sintering temperature. The sintering temperature may be developed by an induction heater as well as a resistance heater.

The powder deposits 18' are sintered in the sintering furnace 37. After sintering, the powder deposits 18 are removed from the belt. They are porous sintered masses suitable for fabricating capacitor anodes.

The present invention is an ideal method for fabricating anodes for solid electrolytic tantalum capacitors. The following process illustrates the present invention as applied to tantalum anodes.

Tantalum powder is mixed with water and transferred onto a mold such as the mold 10 shown in FIG. 1. The use of dry powder is possible if the cavities have been pre-filled with water, but more reliable filling of the molds and better wetting of the powder is obtained with moistened powder. The following range of ratios of powder weight to water weight was found to be satisfactory:

Range: 5-20 parts by weight powder to 1 part by weight of water.

It is essential that the powder settle in an excess of water in the cavities and fill them completely after settling.

In accordance with the present invention, it has been found that anodes beyond a certain size can not be processed into high voltage capacitors (50 volts and higher) with acceptable yield if they are made in prismatic shapes. A typical rating, e.g., 22uF–50 VDC, requires the use of a cylindrical anode 0.45" long with a cross section (square, rectangular, or circular) of 0.04 in$^2$ and an average weight of 2 grams. Using our standard process as described in application Ser. No. 17,519 processing yields of about 50 percent or less are sometimes obtained. Also the life test behavior was less than desired.

By incorporating a hole perpendicular to the long axis of the rectangular anode (FIG. 7A) we would process such anodes into capacitors with yields exceeding 90 percent following the same process specifications otherwise. Two or more holes (FIG. 7B), may be needed for even larger anodes.

The anodes are preferably of prismatic configuration with a hole extending partly or completely through the body of the anode.

In addition to the significantly higher processing yields often (approaching 100 percent) improved life test characteristics, lower failure rate and improved frequency characteristics are obtained.

The dissipation factor (DF) and capacitance of capacitors made from anodes with holes vary less with frequency than similar capacitors made from anodes without holes. This is shown in Tables 1 and 2 for capacitor anodes made from powder with average Fisher particle sizes of 4 microns and 10 microns, respectively.

TABLE 1:

Change of DF and capacitance with frequency for capacitors made from anodes with and without hole and from powder with average Fisher particle diameter of 4 microns.

| | Frequency | 120 | 1,000 | 5,000 | 10,000 Hz |
|---|---|---|---|---|---|
| DF (%) | With hole | 2.5 | 20 | 97 | — |
| | Without hole | 5.5 | 29 | 100 | — |
| $C/C_{120Hz}$ | With hole | 1 | .995 | .989 | .985 |
| | Without hole | 1 | .982 | .955 | .865 |

TABLE 2

Change of DF and capacitance with frequency for capacitors made from anodes with and without hole and from powder with average Fisher particle diameter of 10 microns.

| | Frequency | 120 | 1,000 | 5,000 | 10,000 Hz |
|---|---|---|---|---|---|
| DF (%) | With hole | 1.0 | 2.5 | 9 | 18 |
| | Without hole | 1.5 | 5.5 | 20 | 40 |
| $C/C_{120Hz}$ | With hole | 1 | .996 | .993 | .991 |
| | Without hole | 1 | .98 | .958 | .935 |

For capacitors made from anodes with holes the DF is generally 30 to 50 percent less at 120 Hz and 1,000 Hz and, for 10 micron powder anodes, 50 percent less at 10,000 Hz.

The capacitance decrease (capacitance at 120 Hz = 100 percent) at 10,000 Hz for 4 micron powder anodes is only 1.5 percent with hole versus 13.5 percent without hole. For 10 micron powder anodes the decrease is 0.9 percent and 6.5 percent respectively.

Preferably a sintered density of about 6 to 10 g/cc is obtained, and most preferably a specific capacitance of at least 2,000 ufV/g and a volumetric efficiency of at least 20,000 ufV/cm$^3$ is realized in the anodes.

The process works best with powder that contains a certain fraction of powder particles in the low micron range. Commercially available tantalum powder, for example, powder grades with average Fisher particle diameters of 10–4 microns, respectively operate very efficiently. However, low capacitance powders, with average Fisher particle diameters of 100 microns may not work as efficiently with the above technique since the dried powder compacts before sintering will not have sufficient green strength and may crumble. The excess powder is removed leaving the cavities 11 filled with a predetermined amount of moist tantalum powder. After the excess slurry has been scraped off one finds excess of water on the top of the cavities. After freezing, transfer to the sintering furnace and thawing on the tape support carrying the pellet through the furnace one finds that this excess amount of water leads to the disintegration of the pellet and losses of shape since the powder starts to flow in any excess of water. It is important, therefore, that this excess amount of water be removed prior to freezing. For example, the water content of the moist tantalum powder after scraping is between about 4 and 20 percent by weight depending upon the powder grade. By drying under infrared lamps or other suitable means the moisture content is generally reduced to about 2 to 10 percent depending on the powder grade. Obviously, too little water will not give satisfactory freezing of the moist powder and loss of powder and strength will result.

The given percentages are approximate figures and must be varied with the type of powder used. For example, powders with the lower average particle size will require somewhat higher percentages of water than those with higher average particle sizes.

TABLE III

| Average particle size: | Water Content (Wt. %) | |
|---|---|---|
| Microns | Before Drying | After Drying |
| 10 | 6.5% by weight | 5% by weight |

| 4 | 10.8% by weight | 9.5% by weight |

The mold with the moist tantalum powder is cooled until the water is solidified. The frozen tantalum powder deposits are removed from the mold and then placed on tantalum foil. After the frozen deposits are placed on the tantalum foil, they are thawed and dried. The tantalum foil with the deposit disposed thereon is then placed in a sintering furnace where the tantalum powder is sintered. The sintering is carried out from 1800°C to 2500°C for 1 to 60 minutes. The higher sintering temperatures require less time.

The sintering must take place in an inert atmosphere or in a vacuum. It has been found that high purity tantalum powder can be adequately sintered in a high purity argon atmosphere. The tantalum pellets will normally be sintered on tantalum sheet. It has been found that this can be done without excessive sticking of the pellet to the foil by using annealed tantalum foil. Also the partial drying of the powder in the cavities eliminates the formation of any liquid slurry on the tape after thawing which would otherwise provide intimate contact between the support sheet and the porous pellet and lead to excessive sticking.

After removal of the sintered anode from the belt a lead wire is welded or otherwise attached to a sintered slug of metal obtained by the freezing, thawing, drying and sintering techniques described in this specification. More specifically, the pellets are produced by freezing moistened powder in cavities, placing the frozen powder masses on a sheet of the same metal, thawing the powder, drying the powder, presintering the powder, removing the resulting slugs from the sheet and resintering the slugs. Suitable lead wires may be welded to the slugs before the resintering operation to complete the anode.

FIG. 5 is an illustration of a porous sintered slug 43 with a lead wire 44 attached thereto at the point 45. The lead wire 44 will usually be welded to the slug 43. Note hole 47.

EXAMPLES

A rubber mold with cavities of appropriate shape and size, for example 0.2 × 0.2 × 0.45 inches with integral pins as shown in FIG. 2 are filled with a slurry of tantalum powder in water. Excess powder is removed with a wiper blade. The mold with wet powder is dried partially and then frozen. The frozen pellets are removed from the mold, e.g., by flexing the mold and blowing the pellets out by means of compressed air.

The frozen pellets are placed on a tantalum belt, allowed to thaw and passed through an inert gas flushed presinter furnace. The presintered pellets are removed from the belt and leads are attached to them by welding. A final sintering operation is carried out in vacuum at temperatures from 1800° to 2200°C, depending on the type of powder used.

Formation of the oxide film in 0.1% $H_3PO_4$ at 85°C and 15 ma/g to 200V is followed by stabilization for 75 minutes at this voltage. Application of $MnO_2$ in 10 conversions of manganese nitrate solution at 250°C is combined with three reformations, after the first, sixth and last coat. Cathode coatings of colloidal graphite and silver paint precede lead attachment and encapsulation.

For comparison anodes without hole have been processed according to the same specification. The results for both types of anodes are given on the following page.

TABLE IV

22uF - 50 V Capacitors (2g anodes, 10u particle size)

| Run No. | No. of Units | DCL(uA)(Ave.) | Yield | DF(%)(Ave.) | |
|---|---|---|---|---|---|
| 1a | 24 | .28 | 92 | 1.05 | |
| 2a | 43 | .25 | 95 | .84 | With |
| 3a | 21 | .22 | 95 | .69 | Hole |
| Ave. | 88 | .25 | 94 | .86 | |
| 1b | 50 | 1.18 | 55 | 1.17 | |
| 2b | 29 | .46 | 48 | 1.05 | Without |
| 3b | 31 | .45 | 45 | .85 | Hole |
| Ave. | 110 | .70 | 49 | 1.02 | |

The results given in Table IV show a significant difference in the overall processing yield. Anodes without hole had yields only about one half of the yield obtained with anodes containing a hole.

Figure 8:
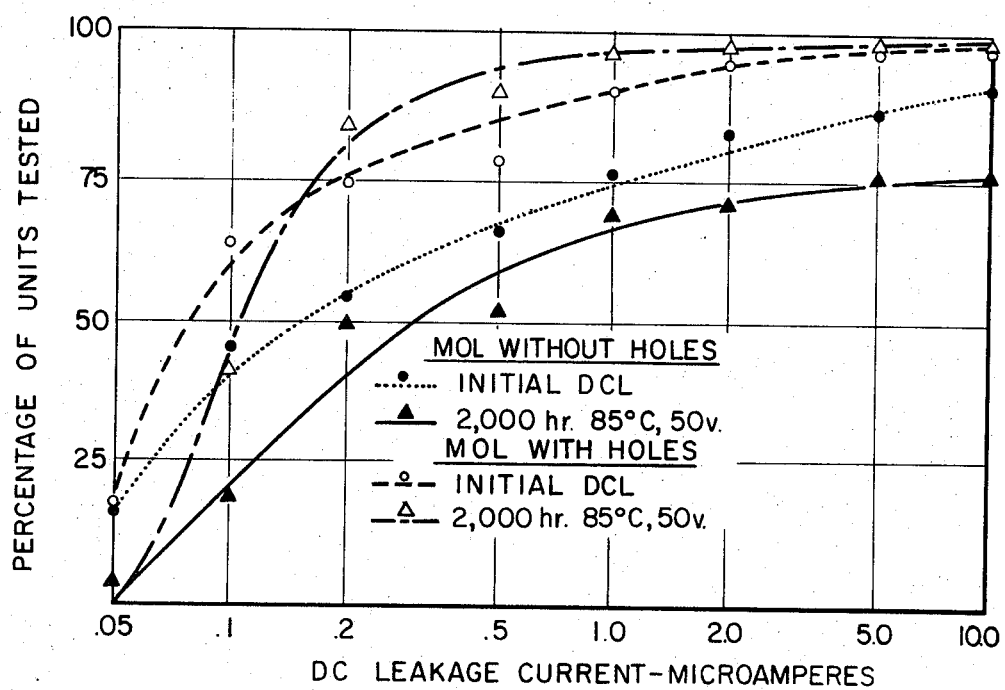
FIG. 8 is a plot of D.C. leakage against percent of units tested after life testing.

The difference in dissipation factor at 120 c/s is significant for this powder type (10 micron). Anodes of similar size made from 4 micron powder for low voltage application showed average DF values at 120 c/s about 50 percent lower for anodes with hole. The DCL distribution for capacitors made from anodes with hole is tighter than that for anodes without holes as can be seen in FIG. 8. This indicates that the anodes are damaged less during processing if there is access to the center of the anode.

Figure 9:
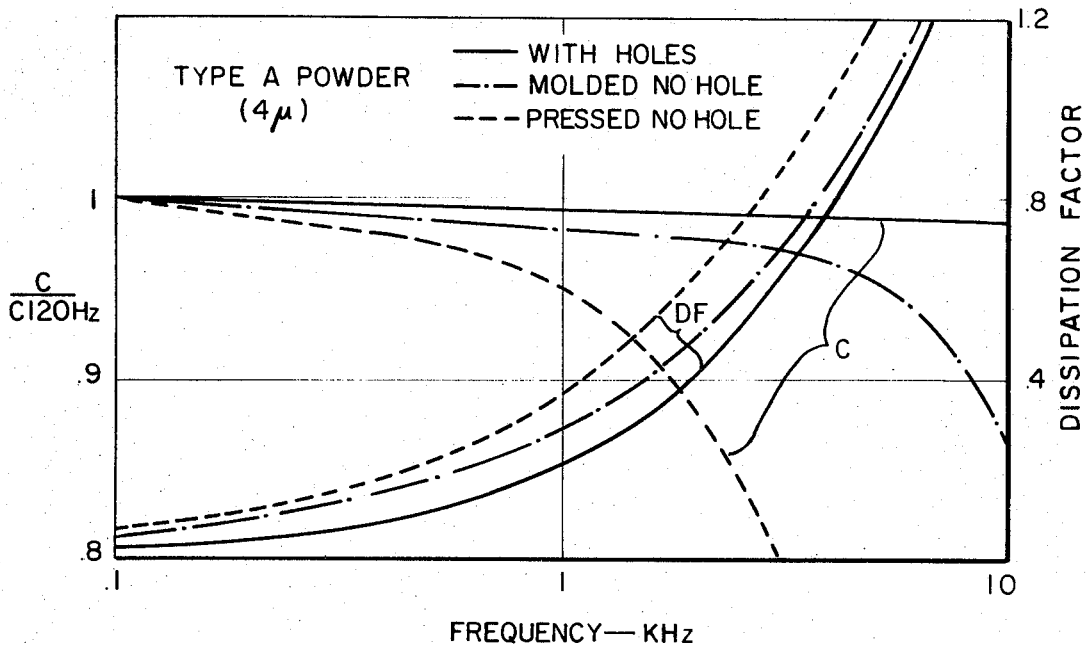
FIGS. 9 and 10 are plots of frequency against capacitance change with dissipation factor.
Figure 10:
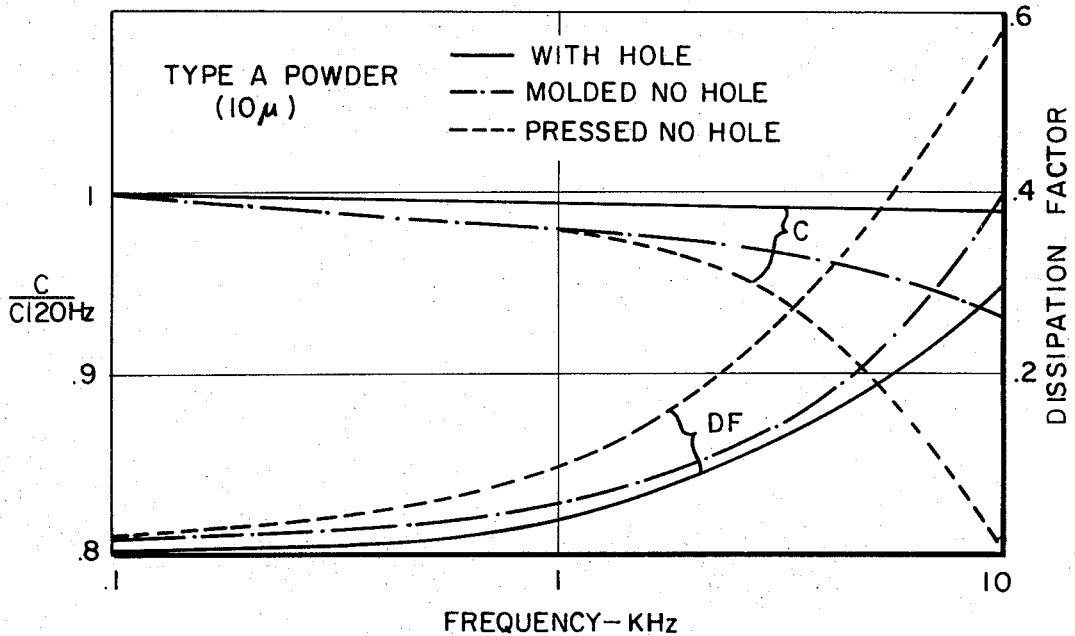

Load life results are also given in FIGS. 9 and 10. The distribution of DCL for a given group of capacitors is tighter for those with holes both initially and after 2,000 hours at 85°C, 50 VDC. No failures were observed for capacitors made from anodes with holes while 25 percent of the units in the control group without hole failed on load life test.

The frequency dependency of capacitance and dissipation factor is less for anodes with hole. This is true with respect to molded anodes and even more so with respect to pressed anodes. The addition of a hole leads to less rapid decrease of capacitance and less rapid increase of dissipation factors with increasing test frequency.

What is claimed:

1. A capacitor comprising:
   a molded anode formed of a porous mass of sintered film forming metal powder fused to a film forming metal foil;
   said mass having at least one hole extending perpendicularly to an axis of and at least partially through said porous mass;
   the surface of said anode having a dielectic film formed thereon;
   a solid reducible oxide electrolyte on said dielectric film, filling the entire space of said hole, and extending into the pores of said mass;
   and a cathode electrode coating on the surface of at least a portion of said electrolyte.

2. A capacitor according to claim 1 in which said anode contains more than one hole.

3. A capacitor according to claim 2 in which said hole extends perpendicular to the axis of the anode.

4. A capacitor according to claim 1 in which said hole extends all the way through said anode.

5. A capacitor according to claim 2 in which said hole extends part way into said anode.

6. A capacitor according to claim 1 in which said film forming metal is tantalum.

7. A capacitor according to claim 1 wherein said anode has a density of 6–12 g/cc.

8. A method for fabricating anodes for electrolytic capacitors from a moistened mass of film forming metal powder and a sheet of film forming metal foil, said method comprising: depositing moistened powder having a liquid content of from about 2 to 20 parts by weight per part by weight of liquid into cavities having a predetermined shape and size and a projection to define a hole in said anodes, drying before freezing said moistened powder in said cavities so as to obtain frozen slugs of said powder; removing said frozen slugs from said cavities; placing said frozen slugs on said sheet of foil; thawing said frozen slugs, thereby leaving powder deposits of said predetermined shape and size on said sheet of foil; drying said powder deposits; and sintering said powder deposits, thereby fusing said powder deposits to said foil.

9. A method as in claim 8 wherein said film forming metal is tantalum.

10. A method according to claim 9 in which said liquid is water in an amount of 5 to 10 pints by weight tantalum per part by weight of water.

11. A method as in claim 8 wherein said powder deposits are sintered at 1800°C to 2500°C for 1 minute to 60 minutes.

12. A method according to claim 8 in which said moistened powder is partially dried prior to freezing.

13. A method as in claim 8 wherein said frozen slugs are thawed prior to sintering.

14. A method as in claim 8 wherein said thawed slugs are dried prior to sintering.

15. A method according to claim 14 wherein said slugs are dried in the presence of external heat.

16. A method as in claim 13 wherein said frozen slugs are thawed in the presence of externally applied heat.

17. A method as in claim 8 wherein said liquid is water and said moisture content is about 2 to 10 parts by weight powder per part of water.

* * * * *